United States Patent
Urabe et al.

(10) Patent No.: US 7,533,240 B1
(45) Date of Patent: May 12, 2009

(54) DEVICE WITH MAPPING BETWEEN NON-PROGRAMMABLE AND PROGRAMMABLE MEMORY

(75) Inventors: Masayuki Urabe, Isehara (JP); Saeed Azimi, Union City, CA (US)

(73) Assignee: Marvell International Ltd., Hamilton (BM)

( * ) Notice: Subject to any disclaimer, the term of this patent is extended or adjusted under 35 U.S.C. 154(b) by 339 days.

(21) Appl. No.: 11/194,278

(22) Filed: Aug. 1, 2005

Related U.S. Application Data

(60) Provisional application No. 60/686,158, filed on Jun. 1, 2005.

(51) Int. Cl.
*G06F 12/00* (2006.01)
(52) U.S. Cl. .................. 711/202; 711/102; 711/103
(58) Field of Classification Search ............... None
See application file for complete search history.

(56) References Cited

U.S. PATENT DOCUMENTS

| | | | | | |
|---|---|---|---|---|---|
| 4,319,343 | A | * | 3/1982 | Powell | 365/196 |
| 4,603,399 | A | * | 7/1986 | Cheek et al. | 711/202 |
| 4,610,000 | A | * | 9/1986 | Lee | 365/189.02 |
| 4,802,119 | A | * | 1/1989 | Heene et al. | 714/7 |
| 5,051,897 | A | * | 9/1991 | Yamaguchi et al. | 711/103 |
| 5,481,713 | A | * | 1/1996 | Wetmore et al. | 717/170 |
| 5,623,665 | A | * | 4/1997 | Shimada et al. | 714/5 |
| 5,726,641 | A | * | 3/1998 | Ide | 340/825.22 |
| 5,748,981 | A | * | 5/1998 | Patchen et al. | 710/8 |
| 5,790,860 | A | * | 8/1998 | Wetmore et al. | 717/122 |
| 5,950,012 | A | * | 9/1999 | Shiell et al. | 717/169 |
| 6,049,672 | A | * | 4/2000 | Shiell et al. | 717/168 |
| 6,128,751 | A | * | 10/2000 | Yamamoto et al. | 714/8 |
| 6,237,120 | B1 | * | 5/2001 | Shimada et al. | 714/726 |
| 6,260,157 | B1 | * | 7/2001 | Schurecht et al. | 714/8 |
| 6,330,712 | B1 | * | 12/2001 | Iwaya | 717/100 |
| 6,438,664 | B1 | * | 8/2002 | McGrath et al. | 711/154 |
| 6,772,314 | B2 | * | 8/2004 | Kashine | 711/202 |
| 6,817,015 | B2 | * | 11/2004 | Takata | 717/168 |
| 6,925,521 | B2 | * | 8/2005 | Li et al. | 711/103 |
| 7,310,800 | B2 | * | 12/2007 | Brouwer | 717/168 |
| 2002/0062479 | A1 | * | 5/2002 | Takata | 717/168 |
| 2002/0112115 | A1 | * | 8/2002 | Kashine | 711/103 |
| 2002/0120810 | A1 | * | 8/2002 | Brouwer | 711/103 |
| 2003/0051119 | A1 | * | 3/2003 | Li et al. | 711/210 |

* cited by examiner

*Primary Examiner*—Kevin Verbrugge

(57) ABSTRACT

A memory storage device connectable to a bus comprises a first memory module that stores data, a second memory module that is capable of being programmed, and a memory controller that communicates with the first memory module, the second memory module, and the bus, and that determines an address mapping of selected areas of the first memory module onto the second memory module. When the memory controller receives an access request from the bus, the memory controller accesses data from the first memory module unless the address mapping specifies that the access request maps to the second memory module, whereupon the memory controller accesses replacement data from the second memory module.

73 Claims, 7 Drawing Sheets

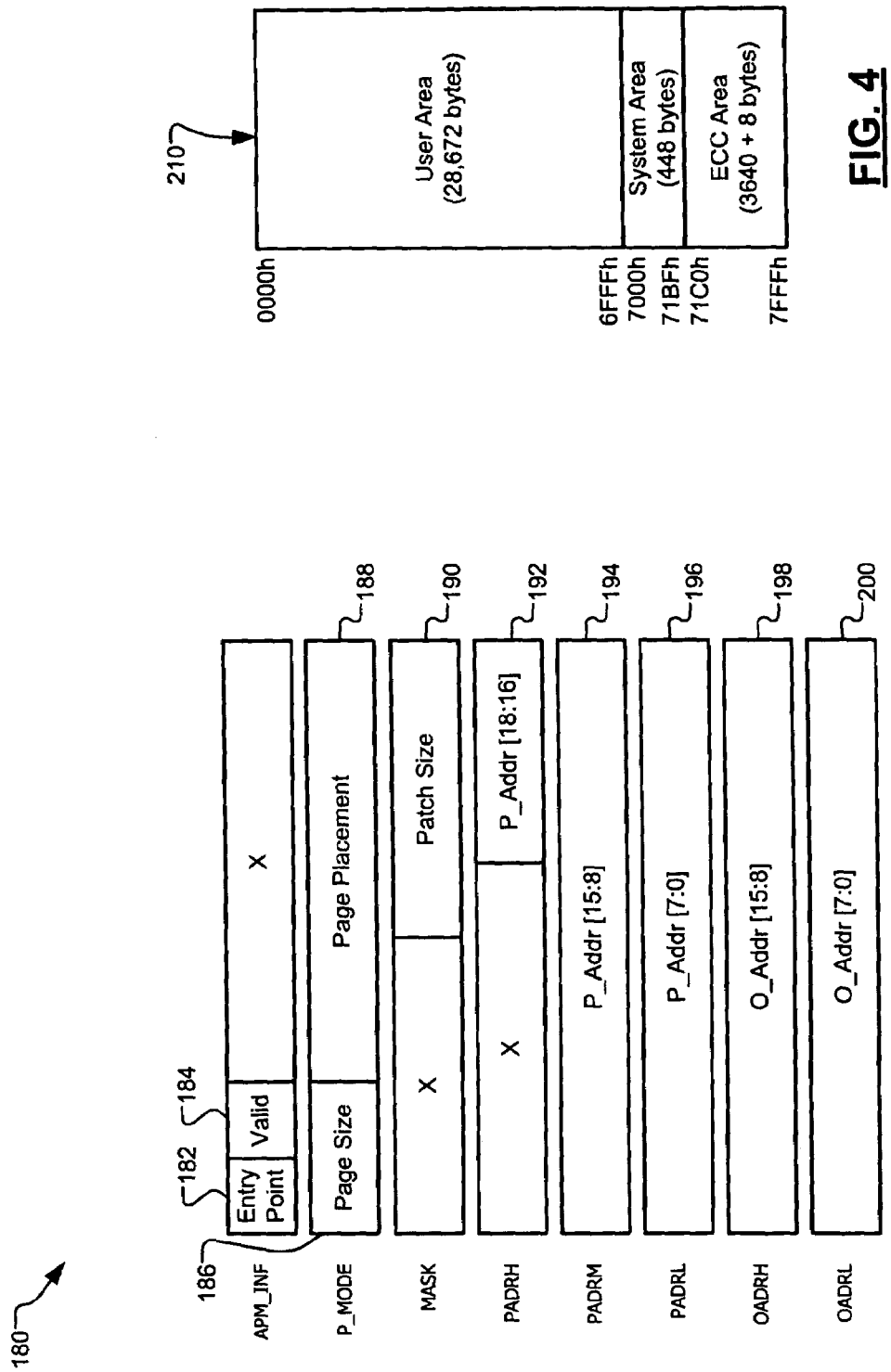

| ECC No. | BYTE ADDRESS | +0 APM_INF | +1 P_MODE | +2 MASK | +3/4/5 P_ADR | +6/7 O_ADR |
|---|---|---|---|---|---|---|
| 1 | 7000h | 00h | 00h | 0h | 000000h | 0000h |
| — | — | — | — | — | — | — |
| 48 | 7178h | 00h | 00h | 0h | 000000h | 0000h |
| 49 | 7180h | 4Xh | XXh | 4h | 02A9CDh | 0280h |
| 50 | 7188h | 4Xh | XXh | 2h | 012345h | 0040h |
| 51 | 7190h | CXh | A8h | 1h | 000000h | 0240h |
| 52 | 7198h | 4Xh | XXh | 2h | 012345h | 0040h |
| 53 | 71A0h | CXh | 00h | 1h | 000000h | 0240h |
| 54 | 71A8h | 4Xh | XXh | 2h | 012345h | 0040h |
| 55 | 71B0h | CXh | B0h | 1h | 000000h | 0000h |
| 56 | 71B8h | 8Xh | B0h | Xh | XXXXXXh | XXXXh |

(Rows 52–55 with 71A0h–71B0h noted as "OLD"; row 56 at 71B8h)

FIG. 5

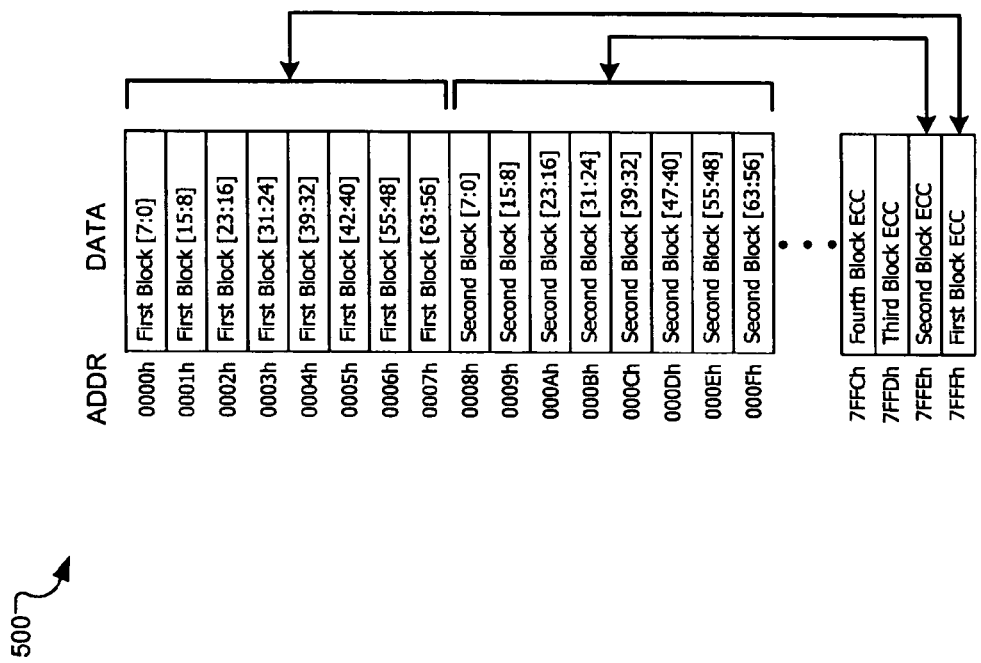

DEVICE WITH MAPPING BETWEEN NON-PROGRAMMABLE AND PROGRAMMABLE MEMORY

CROSS-REFERENCE TO RELATED APPLICATIONS

This application claims the benefit of U.S. Provisional Application No. 60/686,158, filed on Jun. 1, 2005, which is hereby incorporated by reference in its entirety.

FIELD OF THE INVENTION

The present invention relates to read-only memories, and more particularly to re-programmable memories.

BACKGROUND OF THE INVENTION

ROMs (Read-Only Memories) are used in a wide variety of applications, from the BIOS of personal computers to the firmware of consumer electronics devices such as DVD players. The primary distinction between ROMs is whether, and how many times, they can be programmed. The content of a mask ROM is determined by a physical mask used when fabricating the mask ROM. The content of the mask ROM is thus hardwired and cannot be changed after fabrication. Making any changes to future ROMs requires the creation of new masks, an expensive process, and existing ROMs may need to be discarded. Mask ROMs, however, have the advantage of being the least expensive form of ROM to produce.

Another form of ROM is a programmable ROM (PROM). A PROM contains internal fuses that are blown to program the chip. An erasable PROM (EPROM) was developed to allow a ROM to be used more than once. These often rely on ultra-violet light shining on the chip through a transparent window in the packaging. Using ultra-violet lamps is impractical for most consumers, and having to physically place an EPROM under a lamp is inconvenient even for sophisticated users.

Electrically erasable PROMs (EEPROMs) were developed, which could be erased in place without extra equipment. A variant of the EEPROM is Flash ROM, which can be programmed a great number of times. This convenience comes at the expense of greater cost, making it less than ideal for inexpensive mass production. A modern version of the EPROM is one time programmable (OTP) memory, which can generally only be programmed once. Sacrificing the ability to re-program yields a lower cost for the OTP. OTP memory may, however, be programmed section by section, yielding a pseudo-reprogramming capability (similar to a multi-session CD-R).

SUMMARY OF THE INVENTION

A memory storage device connectable to a bus comprises a first memory module that stores data, a second memory module that is capable of being programmed, and a memory controller that communicates with the first memory module, the second memory module, and the bus, and that determines an address mapping of selected areas of the first memory module onto the second memory module. When the memory controller receives an access request from the bus, the memory controller accesses data from the first memory module unless the address mapping specifies that the access request maps to the second memory module, whereupon the memory controller accesses replacement data from the second memory module.

In other features, the address mapping is based on mapping information stored in the second memory module. The first memory module comprises read-only memory. The first memory module comprises mask read-only memory. The second memory module comprises programmable read-only memory. The second memory module comprises one-time programmable memory.

In still other features, the second memory module comprises a user portion and a system portion. The system portion contains the mapping information, which is used to determine address mapping. The user portion contains the replacement data that is selectively accessed instead of data stored in the first memory module. The second memory module further comprises an error correction portion that contains error data that is used to verify contents of the second memory module. The error correction portion contains error data that is used to verify contents of the user portion and the system portion. The error correction portion includes Error-Correcting Code (ECC) data. The system portion contains mapping records. The mapping records are stored in reverse chronological order. One of the mapping records includes data specifying a start of a set of valid mapping records.

In other features, the address mapping provided by the memory controller has a page mode where a block of memory of a first size starting at a first address within the first memory module is mapped to a block of memory of the first size starting at a second address within the second memory module. The first address is fixed. The second address is a multiple of the first size.

In still other features, the address mapping provided by the memory controller includes a plurality of patches, and each patch specifies a block of memory within the first memory module that is mapped to a block of memory within the second memory module. Each of the patches has a size, starting address for the first memory module, and starting address for the second memory module, which are all set independently for each of the patches.

A memory controller for a memory module having a first memory and a second memory comprises a mapping memory that stores mapping data for addresses of the first memory that are to be accessed from the second memory, and a control module that populates the mapping memory with the mapping data, that accesses data from the first memory unless the mapping memory specifies that the access maps to the second memory, and that accesses replacement data from the second memory when the mapping memory specifies that the access maps to the second memory.

In other features, the control module stores the mapping data in the second memory. The control module loads the second memory with the mapping data and the replacement data. The control module populates the mapping memory upon at least one of power on, when the second memory changes, and when a first read request is received by the memory controller. The mapping data is read from the second memory.

A memory storage device connectable to a bus comprises first storage means for storing data, second storage means capable of being programmed for storing data, and control means, which communicates with the first storage means, the second storage means, and the bus, for determining an address mapping of selected areas of the first storage means to the second storage means. When the control means receives an access request from the bus, the control means accesses data from the first storage means unless the address mapping specifies that the access request maps to the second storage means, whereupon the control means accesses replacement data from the second storage means.

In other features, the address mapping is based on mapping information stored in the second storage means. The first storage means comprises read-only memory. The first storage means comprises mask read-only memory. The second storage means comprises programmable read-only memory. The second storage means comprises one-time programmable memory. The second storage means comprises a user portion and a system portion. The system portion contains the mapping information, which is used to determine address mapping. The user portion contains the replacement data that is selectively accessed instead of accessing data stored in the first storage means.

In still other features, the second storage means further comprises an error correction portion that contains error data that is used to verify contents of the second storage means. The error correction portion contains error data that is used to verify contents of the user portion and the system portion. The error correction portion includes Error-Correcting Code (ECC) data. The system portion contains mapping records. The mapping records are stored in reverse chronological order, and one of the mapping records includes data indicating a start of a set of valid mapping records.

In other features, the address mapping provided by the control means has a page mode, whereby a block of memory of a first size starting at a first address within the first storage means is mapped to a block of memory of the first size starting at a second address within the second storage means. The first address is fixed. The second address is a multiple of the first size. The address mapping provided by the control means includes a plurality of patches, and each patch specifies a block of memory within the first storage means that is mapped to a block of memory within the second storage means. Each of the patches has a size and the size is set independently for each of the patches. A starting address in the first storage means is set independently for each of the patches. A starting address in the second storage means is set independently for each of the patches.

A memory controller for a memory module having a first memory and a second memory comprises mapping storage means for storing mapping data for addresses of the first memory that are to be accessed from the second memory, and control means for populating the mapping storage means with the mapping data, for accessing data from the first memory unless the mapping storage means specifies that the access maps to the second memory, and for accessing replacement data from the second memory when the mapping storage means specifies that the access maps to the second memory.

In other features, the control means stores the mapping data in the second memory. The control means programs the second memory with the mapping data and the replacement data. The control means populates the mapping storage means at least one of at power on, when the second memory changes, and when a first read request is received by the memory controller. The mapping data is read from the second memory.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exemplary data structure for storing mapping information within the system area;

FIG. 4 is an exemplary implementation of the programmable memory;

FIG. 5 is a diagrammatic example of contents of the system area;

FIG. 8 is a diagrammatic example of an exemplary implementation of the ECC (Error-Correcting Code) area.

DETAILED DESCRIPTION OF THE PREFERRED EMBODIMENTS

Figure 1:
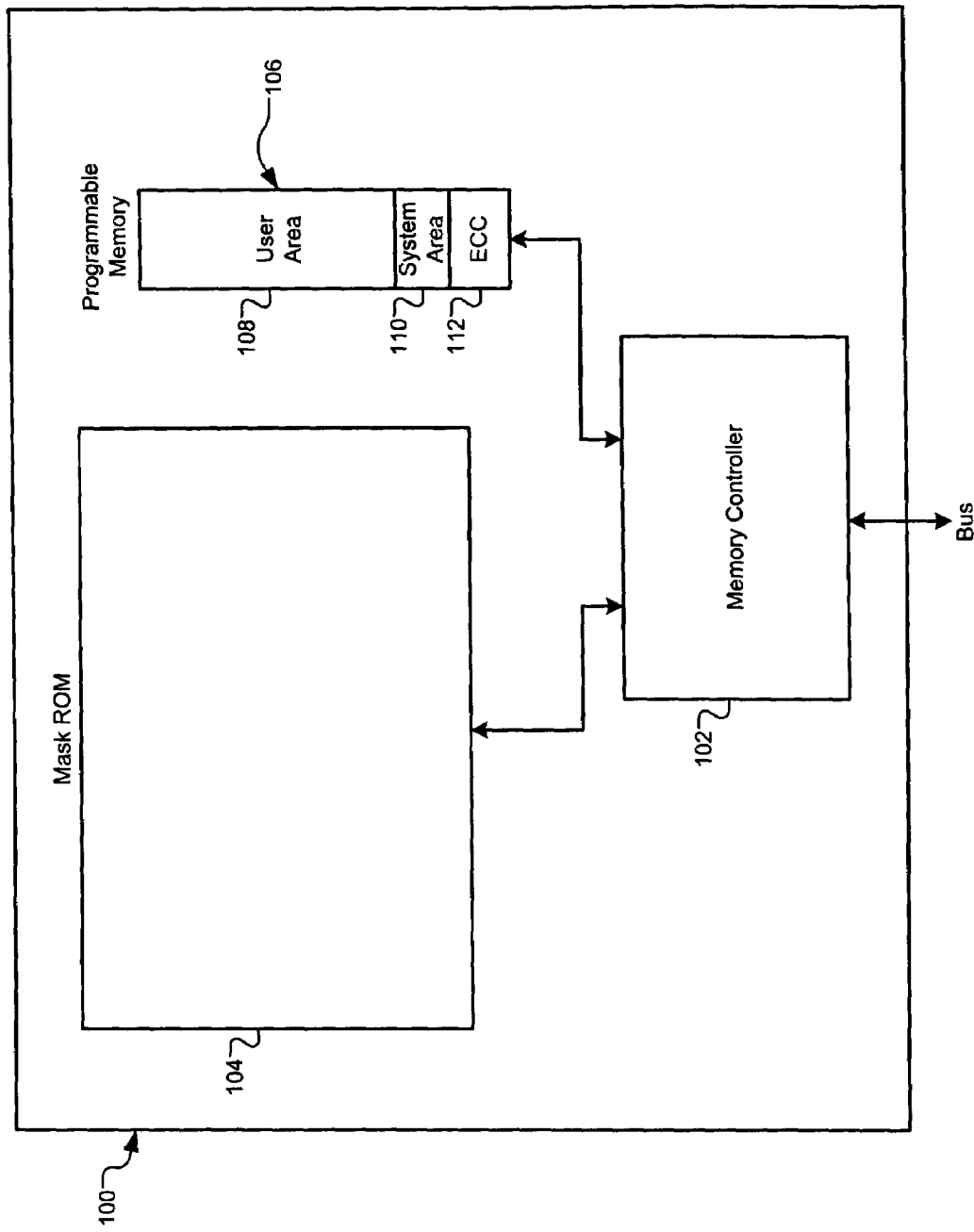
FIG. 1 is a functional block diagram of an exemplary memory device according to the principles of the present invention.

The following description of the preferred embodiments is merely exemplary in nature and is in no way intended to limit the invention, its application, or uses. For purposes of clarity, the same reference numbers will be used in the drawings to identify similar elements. As used herein, the term module, controller and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a block diagram of an exemplary memory device 100 according to the principles of the present invention is presented. A memory controller 102 communicates with a mask ROM (Read Only Memory) 104 and with a programmable memory 106. The programmable memory 106 may be flash ROM, OTP (One Time Programmable) memory, or any other suitable programmable memory. The memory controller 102 communicates outside the device 100 via a bus. The programmable memory 106 contains a user area 108, a system area 110, and an ECC (Error-Correcting Code) area 112. The ECC area 112 may protect both the user area 108 and the system area 110.

By combining a mask ROM 104 with a smaller programmable memory 106, the low cost of a mask ROM can be realized while still allowing for changes via the smaller programmable memory. As is further explained below, the user area 108 contains replacement data and the system area 110 contains instructions as to what portions of the mask ROM 104 are to be replaced with the replacement data from the user area 108. When the memory controller 102 receives a data request, the memory controller 102 checks whether that access falls within one of the replaced memory regions. If it does, the data is retrieved from the user area 108; otherwise data is retrieved from the mask ROM 104.

The memory controller 102 may support both patch mode and page mode. In patch mode, patches of definable sizes from the user area 108 are substituted for data of the mask ROM 104. In page mode, a single block of memory from the user area 108 is substituted for a fixed block of mask ROM 104. Page mode may allow less granularity in the size of the page, fixes the position of the page within the mask ROM address space, and has less granularity in the page's location in the user area 108 than a patch does. While there can be a number of patches, only one page is allowed by the memory controller 102 in this implementation.

Figure 2:
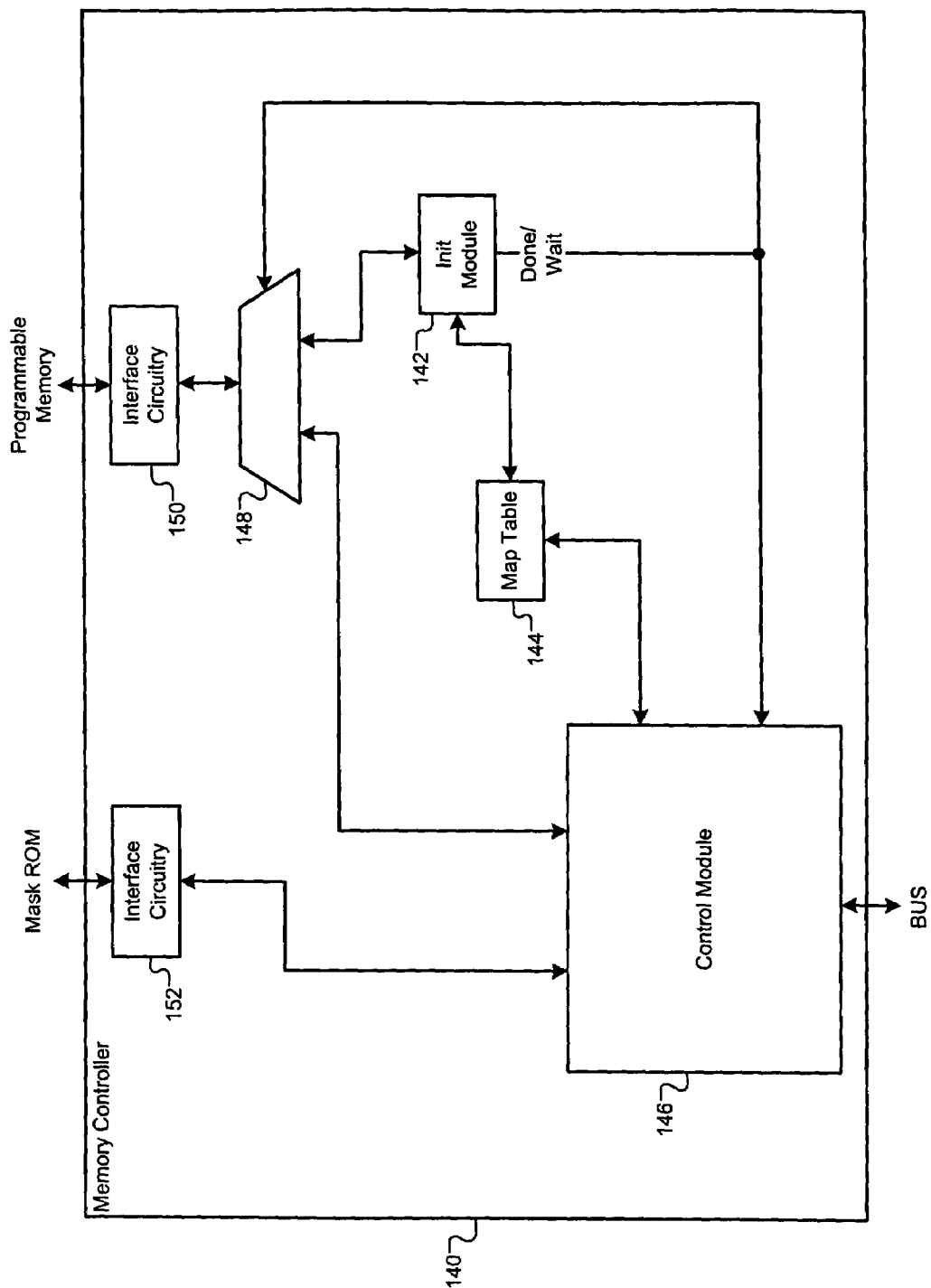
FIG. 2 is a functional block diagram of an exemplary memory controller according to the principles of the present invention.

Referring now to FIG. 2, a block diagram of an exemplary memory controller 140 according to the principles of the present invention is depicted. An initialization module 142 populates a map table 144 with mapping information from the system area 110 of the programmable memory 106. The initialization module may be activated in some implementations when the memory controller 140 is powered on, when an initialization command is received, when a first read command is received, and/or based on other criteria. If an enable flag (not shown) is not set, the initialization module may be prevented from activating in some implementations. When the initialization module 142 is activated, it communicates a wait signal indicating that it is not done to a control module 146 and a multiplexer 148. While this wait signal is being received, the control module 146 waits for the initialization module 142 to finish.

The multiplexer 148 selects either the control module 146 or the initialization module 142 to communicate with programmable memory interface circuitry 150. The wait signal instructs the multiplexer 148 to choose the initialization module 142. Once the initialization module completes, the signal it asserts switches from wait to done. At this point, the multiplexer 148 chooses the control module 146 to communicate with the programmable memory interface circuitry 150. The control module 146 also communicates with ROM interface circuitry 152. When the control module 146 receives a data request to a certain address from a bus, it consults the map table 144. If the address is mapped into programmable memory, the control module 146 retrieves the data from programmable memory via the programmable memory interface circuitry 150. Otherwise, the control module 146 retrieves the data from mask ROM via the ROM interface circuitry 152. If the enable flag is cleared (not set), the control module 146 may not retrieve data from programmable memory.

Most programmable memory, including one time programmable, can be written in sections. Once a section is written, it may not be alterable, though other sections that have not yet been programmed can still be modified. To allow for more flexibility in programming the programmable memory 106 multiple times, records are defined for the system area 110 that contain patch and page information and that indicate whether they are the start of a new set of valid records within the system area. The system area can be arranged so that records are added from the bottom of the system area toward the top and are read from the top of the system area toward the bottom. In this way, the most recent records are read first.

Referring now to FIG. 3, an exemplary data structure 180 for storing mapping information within the system area 110 is presented. The data structure is an eight-byte record consisting of the bytes APM_INF, P_MODE, MASK, PADRH, PADRM, PADRL, OADRH, and OADRL. The most significant bit 182 of APM_INF, Entry Point, indicates that the data structure 180 is a new entry point of either page mode or patch mode information. In other words, this data structure is the first of a set. When Entry Point is equal to one, the P_MODE byte is valid. The next most significant bit 184 of APM_INF, Valid, indicates that the data structure 180 contains valid patch information. If Valid is equal to one, the patch for the present data structure 180 is loaded. When both Valid and Entry Point are equal to zero, the data structure 180 is not used. In other implementations, APM_INF may indicate the start or end of a set and/or indicate the number of valid records within the set.

The upper two bits 186 of P_MODE represent page size. The lower six bits 188 of P_MODE indicate where the replacement page is located in the user area 108 of the programmable memory 106. P_Addr indicates the starting location of mask ROM that should be replaced by data stored in the user area 108. O_Addr indicates the starting address within the user area 108 of the patch that will replace this corresponding area in mask ROM 104. A patch size field indicates how much of mask ROM 104 will be replaced by data in the user area 108 for the particular patch.

The lower four bits 190 of MASK store the patch size field. The lower three bits 192 of PADRH are the three most significant bits (18 through 16) of P_Addr. All eight bits 194 of PADRM represent the next most significant bits (15 through 8) of P_Addr. All eight bits 196 of PADRL represent the least significant bits (7 through 0) of P_Addr. All eight bits 198 of OADRH represent the most significant bits (15 through 8) of O_Addr. All eight bits 200 of OADRL represent the least significant bits (7 through 0) of O_Addr.

Referring now to FIG. 4, an exemplary implementation 210 of the programmable memory 106 is depicted. In this implementation 210 the programmable memory is 32 KB in size. The user area is 28,672 bytes (28 KB) in length, located from address 0000h to address 6FFFh. The system area is 448 bytes in length, and occupies addresses from 7000h to 71BFh. Because patch records are eight bytes in size, the system area can hold 56 records (448÷8=56). The system area can therefore be changed a maximum of 56 times. The ECC area is 3648 bytes in length and occupies addresses from 71C0h to 7FFFh. If there is one byte of ECC for every eight bytes of data, 3640 bytes of ECC are needed for the user and system areas ((24672+448)÷8=3640). The ECC area contains the necessary 3640 bytes, plus eight extra bytes. One skilled in the art will recognize that many other implementation permutations are possible.

Exemplary values for the fields are now discussed. In this implementation, the page always replaces mask ROM 104 starting at address 60000h. The two-bit page size 186 specifies a 28.4 KB page for a value of 00b, a 2 KB page for a value of 01b, a 4 KB page for a value of 10b, and an 8 KB page for a value of 11b. The 28.4 KB page means that the whole of the user and system areas are devoted to the page, and the page replaces addresses 60000h to 671BFh of mask ROM 104.

The six-bit page placement field 188 determines where in the user area 108 the page is stored. The binary value of the page placement field 188 is multiplied by 512 bytes to determine the programmable memory start address. For a 2 KB page, the page placement field 188 can vary between 0h and 34h. For a 4 KB page, the page placement field 188 can vary between 0h and 30h. For an 8 KB page, the page placement field 188 can vary between 0h and 28h.

The four-bit patch size field 190 varies between 0h and 8h. A patch size field 190 of 1h corresponds to a patch size of 64B, 2h corresponds to 512B, 4h corresponds to 2 KB, and 8h corresponds to 4 KB. The patch size field 190 invalidates low order bits from address compare logic. In other words, P_Addr will be aligned to boundaries based upon the size of the patch. For example, a 32 ($2^5$) byte patch causes the lower five bits of P_Addr to be ignored. O_Addr, meanwhile, is aligned to eight-byte boundaries, regardless of patch size. In other words, address comparators ignore the three least significant bits of O_Addr. One skilled in the art will recognize that many other values and bit constructions are possible according to the principles of the present invention.

Referring now to FIG. 5, a diagrammatic example of contents of the system area 110 is presented. The columns of a table 220 are ECC number 222, byte address 224, APM_INF 226, P_MODE 228, MASK 230, P_Addr 232, and O_Addr 234. The byte address 224 assumes that the system area 110 occupies programmable memory from address 7000h to 71BFh. ECC numbers 222 are not actually stored in the system area, but are included in the table 220 for reference. Each row (or record) is protected by an ECC byte, and each row of the table 220 will be indicated by the corresponding ECC number 222. At the time of manufacture, the system area 110 is empty (all-zero in this implementation), and since ECC 1-48 have not yet been programmed in this example, they contain all zeroes. ECC 56, at the end of the system area, was written first. An APM_INF of 8Xh indicates that there is no valid patch information, and that only the page mode (P_MODE) information should be referenced.

ECC 54 and 55 were written next, and they supersede the previously written ECC 56. The APM_INF of ECC 55 (CXh) indicates that there is valid patch information to be read along with P_MODE information. ECC 54 has an APM_INF of 4Xh, which indicates that more valid patch information is to be read, and ECC 54 does not constitute a new set of data records. ECC 52 and 53 were written next, superseding ECC 54 and 55. The APM_INF of ECC 53 (CXh) indicates that there is valid patch information, as does ECC 52 (APM_INF of 4Xh).

Finally, ECC 49, 50, and 51 were written. The APM_INF of ECC 51 (CXh) indicates that it begins a new set of patch data. ECC 50 and 51 also contain valid patch information (APM_INF of 4Xh). The initialization module finds the most recent set of records (ECC 49-51) to read. ECC 52 through 56 are thus ignored. Page mode information is taken from the first record written in the valid set-ECC 51 in this case. Patch information is taken from the patch records in this set (ECC 49-51), delineated on one side by an Entry Point bit equal to 1 (ECC 51) and on the other by an unwritten APM_INF of 00h (ECC 48).

The valid ECC (49-51) are parsed as follows. P_MODE information is read from ECC 51, and is A8h in this case. The page size field (two most significant bits of P_MODE) is 10b, meaning that the page is 4 KB in size. The page placement field (six least significant bits of P_MODE) is 101000b (28h), which means that the 4 KB page is located at 5000h (28h*512=28h*200h=5000h). In this exemplary implementation, the page is always substituted for mask ROM starting at address 60000h. Therefore, the 4 KB section of mask ROM starting at address 60000h (60000h to 60FFFh) is replaced by programmable memory from 5000h to 5FFFh.

Looking now at the three valid patches (ECC 49-51), the MASK of the first patch (ECC 51) is 1h, which signifies a 64 byte page. The first patch has a P_Addr of 000000h and an O_Addr of 0240h, meaning that mask ROM memory from 000000h to 00003Fh is replaced with programmable memory from 0240h to 027Fh. The second patch (ECC 50) is 512 bytes (MASK of 2h) in size, and replaces mask ROM memory from 012200h (P_Addr is 012345h) to 0123FFh with programmable memory from 0040h (O_Addr is 0040h) to 023Fh. The starting mask ROM address is 12200h, instead of 12345h, because the 512-byte ($2^9$) patch size means that the nine least significant bits of P_Addr are ignored. The third patch is 2 KB (MASK of 4h), and replaces mask ROM memory from 02A800h (P_Addr is 02A9CDh) to 02AFFFh with programmable memory from 0280h (O_Addr is 0280h) to 0A7Fh. Again, the starting mask ROM address is 02A800h because the 11 least significant bits ($2K=2^{11}$) of P_Addr are ignored.

Figure 6:
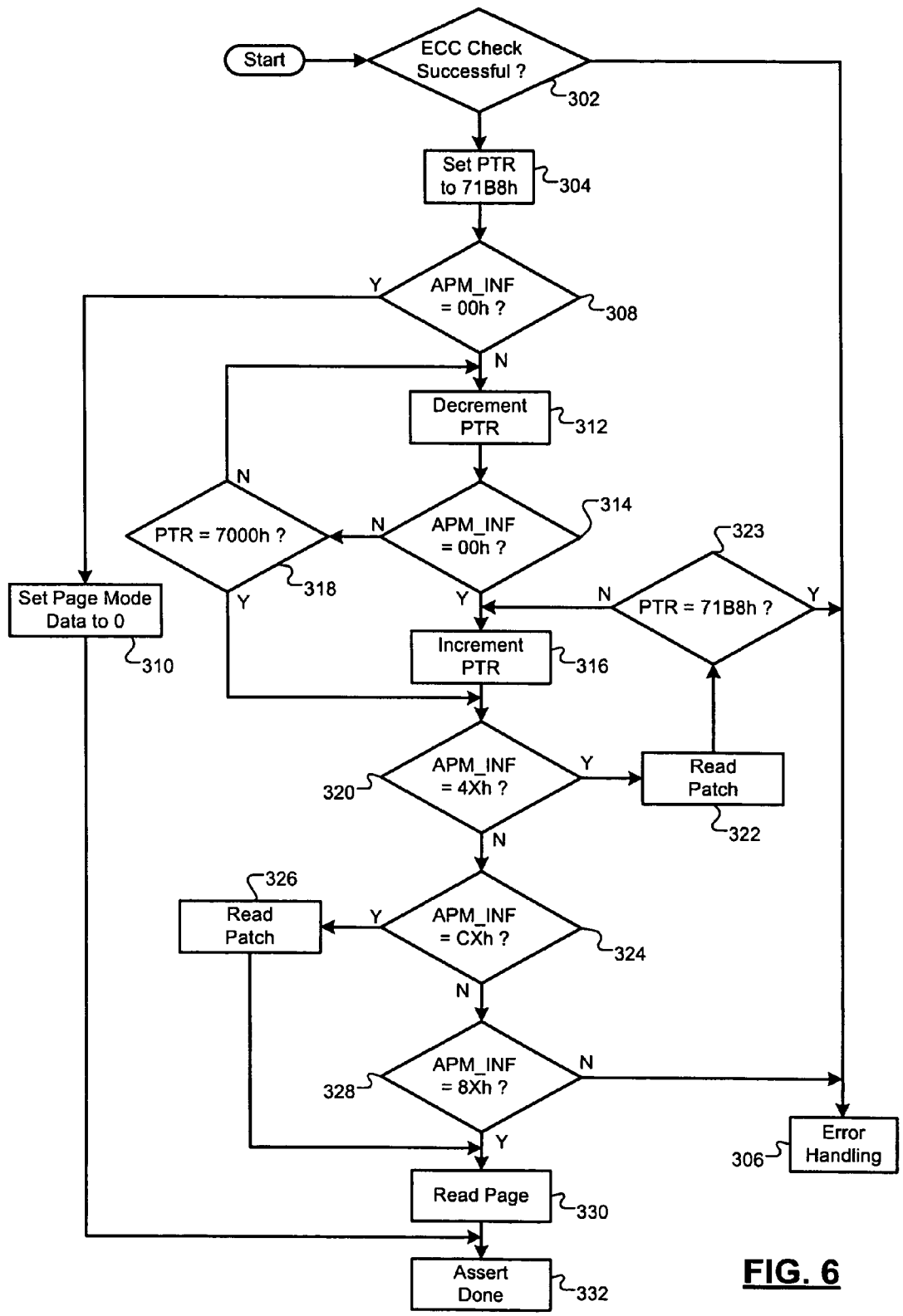
FIG. 6 is a flow chart depicting exemplary steps performed by the initialization module.

Referring now to FIG. 6, a flow chart depicts exemplary steps performed by the initialization module 142. Control begins in step 302 where an optional ECC check of the system area is performed. If the ECC check is successful, control continues in step 304; otherwise control transfers to step 306, where error handling is performed. In step 304 a memory pointer PTR is initialized to 71B8h, which is the last data record of the system area. Because records are added from bottom to top, the system area is searched from bottom to top until an all zero entry is found. The record prior to the all zero entry is the most recently written system record. The system records are then read from the most recent record down until a start of group is reached, which is signified by an APM_INF of either CXh or 8Xh.

In step 308 APM_INF (accessed with PTR offset by zero) is checked against a value 00h. If APM_INF is equal to 00h control transfers to step 310; otherwise control transfers to step 312. In step 312 PTR is decremented and control continues with step 314. If APM_INF is equal to 00h in step 314, control transfers to step 316; otherwise control transfers to step 318. In step 318, if PTR is equal to 7000h, signifying that control has reached the beginning of the system area, control transfers to step 320; otherwise control returns to step 312. In step 316 PTR is incremented and control continues in step 320. In step 320, if APM_INF is equal to 4Xh, control transfers to step 322; otherwise control transfers to step 324.

In step 322 patch data is read, and control continues in step 323. In step 323, if PTR is equal to 71B8h, control transfers to step 306 for error handling; otherwise control returns to step 316. Error handling is appropriate because the bottom-most record (71B8h) should have an Entry Point value of one (but the APM_CNT here of 4Xh has a most significant bit that is zero). In step 324, if APM_INF is equal to CXh, control transfers to step 326; otherwise control transfers to step 328. In step 326 patch data is read and control continues in step 330. In step 328, if APM_INF is equal to 8Xh, control transfers to step 330; otherwise control transfers to step 306 for error handling. Error handling is appropriate because APM_INF should only have assumed the values 4Xh, 8Xh, or CXh. In step 330 page mode information is read and control continues in step 332, where a done signal is asserted and control ends. In step 310 P_MODE is set equal to zero and control transfers to step 332. Control could alternately begin reading at the top of the system area in some implementations. In addition, other optimizations are possible, such as sorting the valid patches based on P_Addr to allow for faster searching when identifying whether a particular address has been replaced.

Figure 7:
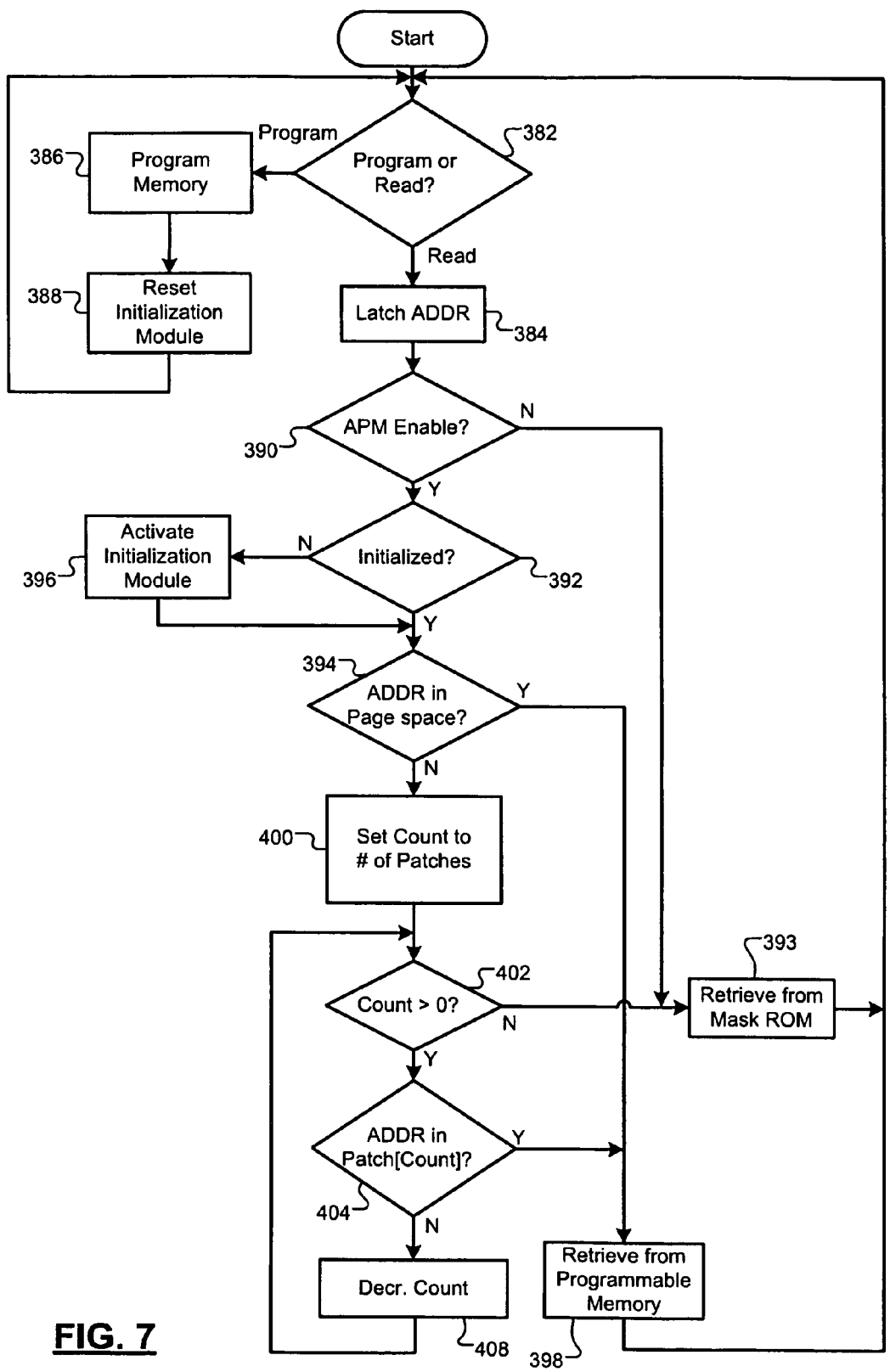
FIG. 7 is a flow chart depicting exemplary steps performed by the control module.

Referring now to FIG. 7, a flow chart depicts exemplary steps performed by the control module 146. Control starts at step 382, where control waits for a program or read request. If the request is to read, control transfers to step 384; otherwise control transfers to step 386. In step 386 the programmable memory is programmed and control continues in step 388. In step 388 the initialization module is reset, and when the initialization module completes, control returns to step 382.

In step 384 the address of the requested read is latched and control transfers to step 390. If an enable flag is set, control transfers to step 392; otherwise control transfers to step 393, where the requested address is retrieved from mask ROM and control returns to step 382. In step 392 control transfers to step 394 if patch and page mode information has been initialized; otherwise control transfers to step 396. In step 396 the initialization module is activated and upon completion, control transfers to step 394.

In step 394, if the address is in the page space, control transfers to step 398; otherwise control transfers to step 400. In step 398, the requested address has been determined to be remapped, and is therefore retrieved from programmable memory; control then returns to step 382. In step 400 a variable Count is set to the number of valid patches, and control transfers to step 402. In step 402 Count is compared with zero. If Count is greater than zero, control transfers to step 404; otherwise control transfers to step 393.

In step 404, if the address is in the patch referenced by Count, control transfers to step 398; otherwise control transfers to step 408. In step 408 count is decremented and control returns to step 402. In step 393 Count is zero, which means that no patches have been found that contain the requested address. Therefore, in step 393, the requested address is retrieved from mask ROM and control returns to step 382. There are many other possible implementations of this architecture. For example, variations such as individually enabling patch mode and page mode, and automatically initializing one or the other upon power-on are contemplated.

Referring now to FIG. 8, an exemplary implementation 500 of the ECC (Error-Correcting Code) area is depicted. In this example, eight bytes of data are combined as a block and matched with one byte of ECC information. For instance, addresses 0000h through 0007h are combined as a first block and matched with an ECC byte at address 7FFFh. A second block of data, from address 0008h to 000Fh, is paired with an ECC byte at address 7FFEh. In this way, data at the top of the user area matches ECC at the bottom of the ECC area.

This mapping can be represented mathematically as follows. If the number of address bits is denoted as N (15 in this case), and the number of data bytes matched up with a single ECC byte is 2 raised to the power M (3 in this case), the address of the ECC byte for any given data address is equal to $((2^M-1)<<(N-M))$ & $\sim(ADDR>>M)$. The operators signify the following: << is the left-shift operator, >> is the right-shift operator, $\sim$ is a bitwise inversion, and & is a bitwise AND. The first term, $((2^M-1)<<(N-M))$, remains constant for a given implementation. In this implementation, it is equal to $(2^3-1)<<(15-3)=111b<<12=111000000000000b$ (7FFFh). For example, the ECC address for data address 000Ah is 7FFFh & $\sim$(000Ah>>3)=7FFFh & $\sim$0001h=7FFFh & FFFEh=7FFEh.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A memory storage device connectable to a bus, comprising:
   a first memory module that stores data;
   a second memory module that is reprogrammable and that includes one-time programmable memory sections; and
   a memory controller that communicates with said first memory module, said second memory module, and the bus, and that determines an address mapping of selected areas of said first memory module onto said second memory module,
   wherein when said memory controller receives an access request from the bus, said memory controller accesses data from said first memory module unless said address mapping specifies that said access request maps to said second memory module, whereupon said memory controller accesses replacement data from said second memory module.

2. The device of claim 1 wherein said first memory module comprises read-only memory.

3. The device of claim 2 wherein said first memory module comprises mask read-only memory.

4. The device of claim 1 wherein said second memory module comprises programmable read-only memory.

5. The device of claim 1 wherein said address mapping provided by said memory controller has a page mode and wherein a block of memory of a first size starting at a first address within said first memory module is mapped to a block of memory of said first size starting at a second address within said second memory module.

6. The device of claim 5 wherein said first address is fixed.

7. The device of claim 5 wherein said second address is a multiple of said first size.

8. The device of claim 1 wherein said address mapping provided by said memory controller includes a plurality of patches, and wherein each patch specifies a block of memory within said first memory module that is mapped to a block of memory within said second memory module.

9. The device of claim 8 wherein each of said patches has a size and said size is set independently for each of said patches.

10. The device of claim 8 wherein each of said patches has a starting address for said first memory module and said starting address is set independently for each of said patches.

11. The device of claim 8 wherein each of said patches has a starting address for said second memory module and said starting address is set independently for each of said patches.

12. The device of claim 1 wherein said second memory comprises:
   a user portion that includes one-time programmable memory and stores replacement data that is mapped to data of said first memory;
   a system portion that stores instructions indicating which portions of said first memory module to replace with said replacement data; and
   wherein said control module permits searching of unused and valid records of said second memory module for said replacement data and prevents searching of invalid records of said second memory module for said replacement data.

13. The device of claim 1 wherein said control module operates in a patch mode and a page mode,
   wherein said control module when in said patch mode replaces data in a first area of said first memory module during a first of N memory replacement iterations and replaces data in a second area of said first memory module that is independent of said first area during a second of said N memory replacement iterations, and
   wherein said control module when in said page mode replaces data in said first memory module beginning at a predetermined address for each of said N memory replacement iterations.

14. The device of claim 1 wherein said first and second memory modules and said memory controller are implemented together as a single integrated circuit.

15. The device of claim 1 wherein said memory controller determines said address mapping of selected areas of said first memory module onto said one-time programmable memory sections.

16. The device of claim 1 wherein said memory controller accesses said data from said first memory module unless said address mapping specifies that said access request maps to said one-time programmable memory sections, whereupon said memory controller accesses replacement data from said one-time programmable memory sections.

17. The device of claim 1 wherein said second memory module includes a first section and a second section, and
   wherein said control module:
      programs said first section with a first set of records;

programs said second section with a second set of records; and prevents access to said first section based on programming of said second section.

18. The device of claim 1 wherein said control module stores an entry indicator in a record of said second memory module, and wherein said entry indicator identifies a most recent set of records in said second memory module.

19. The device of claim 18 wherein said control module refrains from searching and using data in records of said second memory module that were stored before said most recent set of records.

20. The device of claim 18 wherein said mapping records are searched in a reverse chronological order until a zero entry is detected.

21. The device of claim 20 wherein said mapping records are read in a chronological order until said entry indicator is detected.

22. The device of claim 18 wherein said control module refrains from searching and using data in records of said second memory module that are located after said record with respect to a search order of said second memory module.

23. The device of claim 18 wherein said entry indicator indicates one of a page mode and a patch mode.

24. The device of claim 23 wherein said control module when in said patch mode replaces data in a first area of said first memory module during a first of N memory replacement iterations and replaces data in a second area of said first memory module that is independent of said first area during a second of said N memory replacement iterations, and wherein said control module when in said page mode replaces data in said first memory module beginning at a predetermined address for each of said N memory replacement iterations.

25. The device of claim 24 wherein said control module:

stores a first set of records in said one-time programmable memory sections;

stores a second set of records in said one-time programmable memory sections after storage of said first set of records;

stores entry indicators with said second set of records that identify a first record and valid records of said second set of records; and prevents access to memory associated with said first set of records based on said entry indicators.

26. The device of claim 1 wherein said control module decreases an amount of useable memory in said second memory module with storage of a set of records in said second memory module and by refraining from accessing records of said second memory module stored before said set of records.

27. The device of claim 26 wherein said control module prevents reading from and writing to said records stored before said set of records.

28. A memory storage device connectable to a bus, comprising:

a first memory module that stores data;

a second memory module that is capable of being programmed; and a memory controller that communicates with said first memory module, said second memory module, and the bus, and that determines an address mapping of selected areas of said first memory module onto said second memory module, wherein when said memory controller receives an access request from the bus, said memory controller accesses data from said first memory module unless said address mapping specifies that said access request maps to said second memory module, whereupon said memory controller accesses replacement data from said second memory module, and wherein said address mapping is based on mapping information stored in said second memory module.

29. The device of claim 28 wherein said first memory module, said second memory module, and said memory controller are implemented together as a single integrated circuit.

30. A memory storage device connectable to a bus, comprising:

a first memory module that stores data;

a second memory module that is capable of being programmed; and a memory controller that communicates with said first memory module, said second memory module, and the bus, and that determines an address mapping of selected areas of said first memory module onto said second memory module, wherein when said memory controller receives an access request from the bus, said memory controller accesses data from said first memory module unless said address mapping specifies that said access request maps to said second memory module, whereupon said memory controller accesses replacement data from said second memory module, and wherein said second memory module comprises a user portion and a system portion that includes mapping information associated with transfer of data between said first memory module and said second memory module.

31. The device of claim 30 wherein said system portion contains said mapping information, which is used to determine address mapping.

32. The device of claim 31 wherein said first memory module, said second memory module, and said memory controller are implemented together as a single integrated circuit, and wherein said second memory module includes replacement data and mapping instructions.

33. The device of claim 30 wherein said user portion contains said replacement data that is selectively accessed instead of data stored in said first memory module.

34. The device of claim 30 wherein said control module replaces data in said first memory module with data in both of said user area and said system area with respective replacement data and mapping instructions.

35. The device of claim 30 wherein said user portion includes:

a first section with a first set of replacement data; and a second section with a second set of replacement data, wherein said one-time programmable memory sections include said first section and said second section.

36. The device of claim 35 wherein said control module prevents access to said first section based on storage of a most recent set of records in said system area that is associated with said second section.

37. The device of claim 30 wherein said system portion contains mapping records.

38. The device of claim 37 wherein said mapping records are stored in reverse chronological order.

39. The device of claim 38 wherein one of said mapping records includes data indicating a start of a set of valid mapping records.

40. The device of claim 37 wherein said mapping records include a page size field, a page placement field, and a patch length field.

41. The device of claim 38 wherein said mapping records are searched in chronological order to find a most recent set of records that is valid.

42. A memory storage device connectable to a bus, comprising:
   a first memory module that stores data;
   a second memory module that is capable of being programmed; and
   a memory controller that communicates with said first memory module, said second memory module, and the bus, and that determines an address mapping of selected areas of said first memory module onto said second memory module,
   wherein when said memory controller receives an access request from the bus, said memory controller accesses data from said first memory module unless said address mapping specifies that said access request maps to said second memory module, whereupon said memory controller accesses replacement data from said second memory module,
   wherein said second memory module comprises a user portion and a system portion, and
   wherein said second memory module further comprises an error correction portion that contains error data that is used to verify contents of said second memory module.

43. The device of claim 42 wherein said error correction portion contains error data that is used to verify contents of said user portion and said system portion.

44. The device of claim 42 wherein said error correction portion includes Error-Correcting Code (ECC) data.

45. The device of claim 42 wherein said control module in verifying contents of said second memory module combines data in said second memory module with said error data to perform an error correction code check,
   wherein said control module prevents searching said second memory module when said error correction code check is unsuccessful.

46. A memory controller for a memory module having a first memory and a second memory, comprising:
   a mapping memory that is reprogrammable, that includes one-time programmable memory sections and that stores mapping data for addresses of the first memory that are to be accessed from the second memory; and
   a control module that populates said mapping memory with said mapping data, that accesses data from the first memory unless said mapping memory specifies that said access maps to the second memory, and that accesses replacement data from the second memory when said mapping memory specifies that said access maps to the second memory.

47. The memory controller of claim 46 wherein said control module loads the second memory with said mapping data and said replacement data.

48. The memory controller of claim 46 wherein said control module populates said mapping memory upon at least one of power on, when the second memory changes, and when a first read request is received by said memory controller.

49. The memory controller of claim 46 wherein said mapping data is read from the second memory.

50. A memory controller for a memory module having a first memory and a second memory, comprising:
   a mapping memory that stores mapping data for addresses of the first memory that are to be accessed from the second memory; and
   a control module that populates said mapping memory with said mapping data, that accesses data from the first memory unless said mapping memory specifies that said access maps to the second memory, and that accesses replacement data from the second memory when said mapping memory specifies that said access maps to the second memory,
   wherein said control module stores said mapping data in the second memory.

51. A method for controlling a memory storage device connectable to a bus and having a first memory module that stores data, comprising:
   providing a second memory module that is reprogrammable and that includes one-time programmable memory sections;
   determining an address mapping of selected areas of the first memory module to said second memory module;
   receiving an access request from the bus; and
   accessing data from the first memory module unless said address mapping specifies that said access request maps to said second memory module, in which case accessing replacement data from said second memory module.

52. The method of claim 51 further comprising providing a page mode for said address mapping, wherein a block of memory of a first size starting at a first address within the first memory module is mapped to a block of memory of said first size starting at a second address within said second memory module.

53. The method of claim 52 wherein said first address is fixed.

54. The method of claim 52 wherein said second address is a multiple of said first size.

55. The method of claim 51 further comprising providing a plurality of patches for said address mapping, wherein each patch specifies a block of memory within the first memory module that is mapped to a block of memory within said second memory module.

56. The method of claim 55 further comprising setting a size independently for each of said plurality of patches.

57. The method of claim 55 further comprising setting a starting address for the first memory module independently for each of said plurality of patches.

58. The method of claim 55 further comprising setting a starting address for said second memory module independently for each of said plurality of patches.

59. A method for controlling a memory storage device connectable to a bus and having a first memory module that stores data, comprising:
   providing a second memory module that is capable of being programmed;
   determining an address mapping of selected areas of the first memory module to said second memory module;
   receiving an access request from the bus; and
   accessing data from the first memory module unless said address mapping specifies that said access request maps to said second memory module, in which case accessing replacement data from said second memory module,
   wherein said address mapping is determined from mapping information stored in said second memory module.

60. The method of claim 59 further comprising providing a user portion and a system portion of said second memory module.

61. The method of claim 60 further comprising storing mapping information, which is used to determine address mapping, within said system portion.

62. The method of claim 60 further comprising storing said replacement data, which is selectively accessed instead of data stored in the first memory module, within said user portion.

63. The method of claim 60 further comprising storing mapping records within said system portion.

64. The method of claim 63 further comprising storing said mapping records in reverse chronological order.

65. The method of claim 64 further comprising storing data to indicate a start of a set of valid mapping records.

66. A method for controlling a memory storage device connectable to a bus and having a first memory module that stores data, comprising:
   providing a second memory module that is capable of being programmed;
   determining an address mapping of selected areas of the first memory module to said second memory module;
   receiving an access request from the bus;
   accessing data from the first memory module unless said address mapping specifies that said access request maps to said second memory module, in which case accessing replacement data from said second memory module;
   providing a user portion and a system portion of said second memory module; and
   providing an error correction portion of said second memory module, which contains error data used to verify contents of said second memory module.

67. The method of claim 66 further comprising storing error correction data, which is used to verify contents of said user portion and said system portion, within said error correction portion.

68. The method of claim 66 further comprising storing Error-Correcting Code (ECC) data within said error correction portion.

69. A method for controlling a memory module having a first memory and a second memory, comprising:
   providing a mapping memory that is reprogrammable, that includes one-time programmable memory sections, and that stores mapping data for addresses of the first memory that are to be accessed from the second memory;
   populating said mapping memory with said mapping data;
   accessing data from the first memory unless said mapping memory specifies that said access maps to the second memory; and
   accessing replacement data from the second memory when said mapping table specifies that said access maps to the second memory.

70. The method of claim 69 further comprising populating said mapping table upon at least one of power on, when the second memory changes, and when a first read request is received.

71. The method of claim 69 further comprising reading said mapping data from the second memory.

72. A method for controlling a memory module having a first memory and a second memory, comprising:
   providing a mapping memory that is reprogrammable, that includes one-time programmable memory, and that stores mapping data for addresses of the first memory that are to be accessed from the second memory;
   populating said mapping memory with said mapping data;
   accessing data from the first memory unless said mapping memory specifies that said access maps to the second memory;
   accessing replacement data from the second memory when said mapping table specifies that said access maps to the second memory; and
   loading said mapping data into the second memory.

73. The method of claim 72 further comprising programming the second memory with said mapping data and said replacement data.

\* \* \* \* \*